United States Patent [19]

Devreux et al.

[11] 4,411,914

[45] Oct. 25, 1983

[54] PROCESS FOR THE PRODUCTION OF A COLLOIDALLY STABLE BEER

[75] Inventors: André F. O. Devreux, Mons; Janis Jerumanis, Wavre, both of Belgium

[73] Assignee: Compagnie Internationale de Participation et d'Investissement Cipari S.A., Luxembourg, Luxembourg

[21] Appl. No.: 326,988

[22] Filed: Dec. 3, 1981

Related U.S. Application Data

[63] Continuation of Ser. No. 156,531, Jun. 5, 1980, abandoned.

[30] Foreign Application Priority Data

Jun. 7, 1979 [FR] France ................................ 79 14556

[51] Int. Cl.³ ................................................ C12G 3/00
[52] U.S. Cl. ..................................................... 426/12
[58] Field of Search .............................. 426/12, 330.4

[56] References Cited

U.S. PATENT DOCUMENTS

| | | | |
|---|---|---|---|
| 2,011,096 | 8/1935 | Wallerstein | 426/12 |
| 3,597,219 | 8/1971 | Wildi et al. | 426/12 |
| 4,008,339 | 2/1977 | Matsuda et al. | 426/330.4 |

OTHER PUBLICATIONS

Huyngh, J. Amer. Soc. Brew. Chem. 35, 1977, p. 153.

*Primary Examiner*—Hiram H. Bernstein
*Attorney, Agent, or Firm*—Sughrue, Mion, Zinn, Macpeak & Seas

[57] ABSTRACT

This invention relates to a process for the production of a colloidally stable beer. More particularly, the object of the invention is to modify the common method of preparation of beer, in order to improve the colloidal stability of the beer, i.e. in order to reduce the colloidal turbidity in the beer.

A sufficient proportion of polyphenoloxidase is added to the brew or to the wort for precipitating the polymers formed by oxidation of the polyphenols by said polyphenoloxidase, jointly with the proteins in presence, the obtained precipitate being separated by filtration after the oxidation of the malt.

13 Claims, No Drawings

PROCESS FOR THE PRODUCTION OF A COLLOIDALLY STABLE BEER

This is a continuation, of application Ser. No. 156,531, filed June 5, 1980, now abandoned.

PRIOR ART

It is known that, among the desired organoleptic characteristics of the beer, the clarity and the brightness thereof are important for the consumer.

Turbidity of colloidal nature frequently appears in beer, due to the oxidation of the polyphenols which are present therein and which form polymers becoming linked to the present proteins so as to form a colloidal precipitate appearing as an irreversible fog or cloudiness.

Various processes have been proposed for avoiding or delaying the formation of such turbidity, by removing the proteins which cause the appearence of such turbidity.

For example, it has been suggested to add proteolytic enzymes, such as papain, formaldehyde or tannin to beer.

A drawback of these additions is that materials of extraneous origin are introduced into the beer, such an introduction being not permissible in many countries or imposing the mention of the presence of said materials on the marketed beer bottles. Moreover, the results obtained by said additions are not always satisfactory, at least at the admissible concentrations of the added materials.

Another known process involves the filtration of the finished beer on polyvinylpyrrolidone which has a great affinity for the polyphenols. This process is expensive, since it requires the use of a special filter and an additional operation, whereas the high cost of the polyvinylpyrrolidone requires the regeneration thereof and the use of polyvinylpyrrolidone only allows the removal of part of the polyphenols which are present in the beer, the remaining part becoming oxidized and forming polymers which still form a colloidal cloudiness with the proteins.

Finally, it is also known to treat beer on silicagel which fixes the proteins, but the yield of this process is not sufficient, since less that 10% only of said proteins are retained, so that the formation of colloidal turbidity is not sufficiently inhibited.

On the other hand, it is known that some barleys contain an enzyme of the polyphenoloxidase type which promotes the polymerization by oxidation of the polyphenols. However, this enzyme gradually disappears during the germination of the barley and particularly during the kilning thereof, so that the malt obtained from said barley does practically no more contain polyphenoloxidase.

Under these circumstances, the known processes for the manufacture of beer do not involve the use of the enzyme in question, this enzyme being considered as unfavourable since it gives an undesirable color to the beer.

BRIEF DESCRIPTION OF THE INVENTION

It has now been found that the use of phenyloxidase, for example as a natural plant extract containing substantial amounts of polyphenoloxidase, during the preparation of beer is favourable, since it causes an oxidation of the polyphenols and the formation of polymers which become fixed onto the present proteins and precipitate with the latter, so that it becomes possible to remove and inhibit the formation of colloidal turbidity in the finished beer, without giving an undesirable color to the latter.

The common method for preparing beer involves the following steps:

(1) preparation of a brew by heating and stirring a mixture of malt and water at a temperature of about 50° C. to 75° C. in a tank during 2 to 3 hours;

(2) filtration of the obtained brew through a filter;

(3) boiling of the beer wort obtained as a filtrate during about 2 hours, after addition of hop to said wort;

(4) filtration of the liquid which has been treated at the boiling temperature;

(5) main fermentation of the filtered wort in the presence of yeast and oxygen during 5 to 10 days;

(6) secundary fermentation or guard of the beer at a low temperature (about 0° to 5° C.) during two to twelve weeks;

(7) filtration of the beer for example on kieselguhr;

(8) strong and bottling of the filtered beer.

This invention relates to a process for the preparation of beer, in which a sufficient amount of polyphenoloxidase for precipitating the polymers formed by oxidation of the polyphenols by said polyphenoloxidase jointly with the present proteins is added to the brew or to the wort, and the obtained precipitate is removed by filtration after oxidation of said wort.

The polyphenoloxidase may be used, according to this invention, either as pure or substantially pure polyphenoloxidase or as a vegetable material containing a sufficient amount of polyphenoloxidase for precipitating the polymers formed by oxidation of the proteins in presence.

The preparation of crude and purified polyphenoloxidase extracts form barley is described in an article of N. Van Huyngh et al published in J. Amer. Soc. Brew. Chem., 35, 1977, page 153.

As vegetable material which may have a sufficient polyphenoloxidase content, an extract of a plant containing a substantial amount of polyphenoloxidase, or an extract of a part of such a plant may be used. Among the plants which may contain substantial proportions of polyphenoloxidase, barley, namely Aramir barley, and wheat may be mentioned.

According to the invention, a polyphenoloxidase enriched plant extract may be used, said extract being obtained by steeping cereal grains containing a sufficient proportion of the enzyme, for example barley or wheat, in water during 24 to 48 hours. It is also possible to use crude cereal grains when they contain enough enzyme.

Preferably a flour obtained form the outer layers containing aleurone cells, which are rich in polyphenoloxidase, of grains, such as wheat grains is used, said flour having an enzymatic power of at least 0.6 micromoles of consumed oxygen per minute and per gram of flour.

In a preferred embodiment of the process according to the invention about 2 to 5% by weight, in respect of the weight of malt, of a grain flour having an enzymatic power of about 0.9 to 1.1 micromoles of consumed oxygen per minute and per gram of flour are used.

The enzymatic power of a flour is measured by determining the amount of oxygen consumed by the flour in a flour-catechol system in the presence of oxygen by a known method.

It has been found that flour of grains containing a sufficient proportion of polyphenoloxidase may be used, preferably in the form of a compressed mass, for example in the form of pellets.

According to an advantageous embodiment of the process according to this invention, the polyphenoloxidase-containing vegetable product, for example in the form of crude grains or flour, possibly compacted, said grains being for example barley grains, for example of the Aramir type, or in the form of polyphenoloxidase extract of said vegetable material is added during the preparation of the malt brew.

The proportion of polyphenoloxidase to be used, in the form of extract, grains or grain parts, preferably ground and/or compacted, varies in accordance with the protein content of the malt. A good proportion of crude enzyme extract is of about 2% by weight of the used malt. When barley of the Aramir variety is used as crude groud grains, a good proportion is of at least 20% by weight of the used malt. When the brewing is made with a mixture of malt and wheat, the latter being in the form of ground crude grains, the proportion of these wheat grains is preferably of about 10 to 20% of the malt weight. When outer parts of wheat grains, from which the bran has been removed and which are particularly rich in polyphenoloxidase, are used, proportions of these preferably ground grain outer parts of about 2 to 10% by weight give excellent results.

EXAMPLES

Examples 1 to 4

The following examples illustrate the invention.

50 g of malt flour have been mixed with various proportions of polyphenoloxidase extract, of ground grains of Aramir barley or wheat or of flour of outer parts of wheat to 400 g of water at 45° C.

In these examples, the following polyphenoloxidase-containing materials have been used.

1. Crude enzyme extract of wheat

This crude extract has been prepared by homogenizing, in a mixer rotating at about 16,000 revolutions per minute, 40 g of wheat flour obtained by screening, with 200 ml of distilled water. The homogeneous mixture has then been centrifuged at 10,000 revolutions per minute and the supernatant liquid has been collected and freeze-dried.

2. Treated Aramir barley or wheat grains

Aramir barley or wheat grains have been steeped during 24 to 48 hours in distilled water. The grains have then been ground and the obtained flour has been used as a product enriched with polyphenoloxidase.

3. Fraction rich in enzyme of wheat grains

This fraction has been obtained by separating from wheat grains the peripheral layer surrounding the endosperm and containing aleurone cells, said layer being located under the outer envelope (straw) of the grains.

The temperature was maintained at 45° C. during 30 minutes, then raised to 70° C. within 20 minutes. This temperature of 70° C. was maintained during 60 minutes for causing the mashing. During this brewing step, the mixture was maintained in contact with oxygen.

The obtained brew was filtered for separating the wort from the spent grain. The wort was then boiled during 30 minutes, in the presence of hop extract.

After filtration and cooling to 10° C., the wort was then fermented by means of yeast (low fermentation) during 10 days.

After separation of 90% of the yeast by filtration, the obtained beer was stored at 0° C. under an atmosphere of carbon dioxide. Finally, the beer was clarified by ultracentrifugation.

The colloidal stability of the beer was measured by the Chapon test with cold alcohol (see Chapon and Chamardin, EBC Proceedings, 1967, pages 389-405).

The results of the tests are indicated in the following table:

TABLE I

| Brewing | Weight percentage of enzymatic product with respect to the weight of malt | Colloidal stability Measure of the turbidity in % |
|---|---|---|
| Malt without enzymatic product (untreated) | 0 | 100 |
| Malt with crude wheat enzyme extract | 2 | 67 |
| Malt with Aramir barley flour | 40 | 82 |
| Malt with wheat flour | 20 | 64.3 |
|  | 30 | 56.3 |
|  | 40 | 36.3 |
| Malt with enzyme-enriched fraction of wheat flour | 5 | 58 |
|  | 20 | 57.2 |

From this table, it appears clearly that, when a brew is prepared in the presence of polyphenoloxidase in the form of an extract or in the form of a natural consumable product containing this enzyme, the colloidal stability of the beer may be reduced in surprisingly high proportions, so that there is practically no more possibility of formation of turbidity or cloudiness in the beer.

It has also been found that compacted masses, such as pellets of polyphenoloxidase-containing cereal flours give particularly good results when added to malt.

It is to be noted that instead of pure or substantially pure polyphenoloxidase or an extract containing this enzyme from barley or wheat or from fractions of these two cereals, other plants or plant parts containing polyphenoloxidase, such as rice, potatoe and the like may be used.

What we claim is:

1. In a process for preparing a colloidally stable beer, the improvement which comprises adding to a mixture of malt flour and water during preparation of a brew, while said mixture is maintained in contact with oxygen, a sufficient amount of polyphenoloxidase for precipitating the polymers formed by oxidation of the polyphenols by said polyphenoloxidase jointly with the present proteins and removing the obtained precipitate by filtration after oxidation of the wort.

2. A process according to claim 1, in which the polyphenoloxidase is added to the malt as a vegetable product rich in polyphenoloxidase or enriched with polyphenoloxidase.

3. A process according to claim 2, in which the polyphenoloxidase is added as an extract from an edible polyphenoloxidase-containing plant.

4. A process according to claim 3, in which polyphenoloxidase is used as an extract from a polyphenoloxidase-containing cereal.

5. A process according to claim 4, in which the cereal is barley or wheat.

6. A process according to claim 4, in which the polyphenoloxidase-containing cereal is used in the form of a flour.

7. A process according to claim 2, in which a flour made from a fraction rich in polyphenoloxidase of cereal grains is used as polyphenoloxidase source.

8. A process according to claim 7, in which a flour of the outer layers containing aleurone cells of cereal grains is used as polyphenoloxidase source.

9. A process according to claim 8, in which about 2 to 5% by weight, with respect to the weight of malt, of a flour having an enzymatic power of about 0.9 to 1.1 micromoles of consumed oxygen per minute and per gram of flour is used.

10. A process according to claim 2, in which cereal grains steeped during 24 to 48 hours in water and ground are used as polyphenoloxidase source.

11. A process according to claim 3, in which about 2% by weight of a crude polyphenoloxidase-containing extract from wheat flour with respect to the used malt weight is used.

12. A process according to claim 2, in which about 10 to about 20% by weight of ground cereal grains with respect to the used malt weight is used.

13. A process according to claim 2, in which a compressed mass of a cereal flour is used as polyphenoloxidase source.

* * * * *